US008325400B2

(12) United States Patent
Chen et al.

(10) Patent No.: US 8,325,400 B2
(45) Date of Patent: Dec. 4, 2012

(54) MULTI-COLOR OFF-AXIS DIGITAL HOLOGRAPHIC SYSTEM AND THE IMAGING METHOD THEREOF

(75) Inventors: Jenq-Shyong Chen, Chiayi County (TW); Shih-Hsuan Kuo, Hsinchu County (TW); Che-Wei Su, Taipei (TW); Jen-Te Liang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 792 days.

(21) Appl. No.: 12/041,128

(22) Filed: Mar. 3, 2008

(65) Prior Publication Data

US 2009/0147334 A1     Jun. 11, 2009

(30) Foreign Application Priority Data

Dec. 10, 2007    (TW) ................................ 96147071 A

(51) Int. Cl.
     *G03H 1/08*      (2006.01)
     *G03H 1/26*      (2006.01)
(52) U.S. Cl. ................. 359/9; 359/22; 359/35
(58) Field of Classification Search ................ 359/9, 10, 359/22, 35; 356/497, 73
See application file for complete search history.

(56) References Cited

U.S. PATENT DOCUMENTS

| | | | |
|---|---|---|---|
| 5,910,660 | A | 6/1999 | Hodel et al. |
| 6,078,392 | A | 6/2000 | Thomas et al. |
| 6,246,495 | B1 | 6/2001 | Yamaguchi |
| 6,262,818 | B1 * | 7/2001 | Cuche et al. ............. 359/9 |
| 6,330,086 | B1 | 12/2001 | Collot et al. |
| 6,525,824 | B1 | 2/2003 | Gutierrez |
| 6,747,771 | B2 | 6/2004 | Thomas et al. |
| 6,760,134 | B1 * | 7/2004 | Schilling et al. ............. 359/10 |
| 6,809,845 | B1 | 10/2004 | Kim et al. |

(Continued)

OTHER PUBLICATIONS

TW OA issued on Nov. 7, 2011.

(Continued)

*Primary Examiner* — Audrey Y Chang
(74) *Attorney, Agent, or Firm* — Morris Manning & Martin LLP; Tim Tingkang Xia, Esq.

(57) ABSTRACT

A multi-color off-axis digital holographic system and the imaging method thereof are disclosed. The multi-color off-axis digital holographic system comprises: a plurality of light emitting diodes, for provide a red (R) beam, a green (G) beam and a blue (B) beam; an interference object lens module, for receiving the R, G, and B beams to generate a beam containing an interference signal; a color imaging device, for receiving the beam containing the interference signal and thus forming a hologram on a surface of the color imaging device by holographic interference while registering the hologram; and a processing device, for receiving the registered hologram form the color imaging device; wherein the processing device perform a zero-filling and reconstructing operations upon the received hologram to obtain phase information of the R, G and B beams. With the aforesaid system, a three-dimensional surface profile with respect to a RG synthetic wavelength is obtained according to a calculation using the phase information of the R and G beams as well as the wavelengths thereof, and similarly, a three-dimensional surface profile with respect to a GB synthetic wavelength is obtained according to a calculation using the phase information of the G and B beams as well as the wavelengths thereof. Thereafter, by performing a calculation using the RG synthetic wavelength and its phase as well as the GB synthetic wavelength and its phase, an overall three-dimensional surface profile with respect to a complete synthetic wavelength is obtained.

9 Claims, 3 Drawing Sheets

U.S. PATENT DOCUMENTS

| | | |
|---|---|---|
| 6,885,460 B2 | 4/2005 | Morita |
| 6,963,406 B2 | 11/2005 | Price et al. |
| 6,999,178 B2 | 2/2006 | Hanson et al. |
| 7,002,691 B2 | 2/2006 | Thomas et al. |
| 7,027,081 B2 * | 4/2006 | Kremen .......................... 348/51 |
| 7,038,787 B2 | 5/2006 | Price |
| 7,069,375 B2 | 6/2006 | Avida et al. |
| 7,116,425 B2 | 10/2006 | Hanson et al. |
| 7,119,905 B2 | 10/2006 | Bingham et al. |
| 7,127,109 B1 | 10/2006 | Kim |
| 7,145,659 B2 | 12/2006 | Yasuda et al. |
| 7,148,969 B2 | 12/2006 | Thomas et al. |
| 7,545,505 B2 * | 6/2009 | Lehmann et al. ............. 356/497 |
| 2007/0035744 A1 | 2/2007 | Lehmann et al. |
| 2007/0103757 A1 | 5/2007 | Kubara et al. |

OTHER PUBLICATIONS

Etienne Cuche, Fr'ed'eric Bevilacqua, and Christian Depeursinge, "Digital holography for quantitative phase-contrast imaging", Institute of Applied Optics, Swiss Federal Institute of Technology, CH-1015 Lausanne, Switzerland, Mar. 1, 1999.

U. Schnars and W. Jüptner, "Direct recording of holograms by a CCD target and numerical reconstruction", Optical Society of America, Jan. 10, 1994.

* cited by examiner

MULTI-COLOR OFF-AXIS DIGITAL HOLOGRAPHIC SYSTEM AND THE IMAGING METHOD THEREOF

FIELD OF THE INVENTION

The present invention relates to a multi-color off-axis digital holographic system and the imaging method thereof, and more particularly, to a holographic system and the imaging method thereof configured with a color imaging device for using a light emitting diode capable of emitting a red, a green and a blue beams as its light source.

BACKGROUND OF THE INVENTION

The most important characteristics of optical metrology using the interferometer technique are the non-contact and high resolution. Digital holography is one kind of optical measurement. It replaces the photochemical processing of emulsions with digital processing of the photoelectric signals from a CCD (Charge Coupled Device) array. With the emergence of high resolution CCDs and the improvement of calculation capacity of computers, holography is becoming a well-proven method capable of quickly catching the 3D information of a sample by one-shot measurement with high resolution. Moreover, digital holography is able to record the amplitude and phase of the wavefront from a target object directly to a single image acquired by a CCD camera in a much more time-efficient manner than the scanning electron microscope (SEM) or white light interferometry (WLI) and thus is well suited to the measurement tasks perform on production lines.

There are two types of digital holography, which are on-axis digital holography and off-axis digital holography. In both of the two aforesaid digital holography, a CCD camera is used for recording optically generated holograms that are then reconstructed numerically by a computer program, by that the reconstructed three dimensional holographic image is composed of a real image, a virtual image and a so-called DC term. In the on-axis digital holography, to remove the virtual image and the DC term from the recorded holograms is enabled by the use of a phase shifting method before the holograms are used for the reconstruction. However, it would require at least three holograms for the phase shifting method so that any measurement using the on-axis holography usually will take a longer time. In the off-axis holography, the virtual image and the DC term are separated from the real image by including an angle between the reference beam and the object beam that is greater than zero so that only a signal hologram will be sufficient for the reconstruction. However, the conventional off-axis holography is shorted in that: the correctness of the parameters relating to the angle included between the reference beam and the object beam will have greatly influence upon the reconstruction result while such included angle is limited by the pixel size of the CCD camera.

Moreover, as the conventional digital holography usually adopts a monochromatic light source for illumination, the numerical reconstruction for obtaining hologram will be restricted by the height of the sample. That is, if the height of the sample is larger than half the wavelength of the light emitted from the monochromatic light source, an adverse condition referred as phase wrapping will occur. In addition, when a monochromatic CCD is adopted for catching images, only one hologram can be obtained for each shot so that it will take three shots to obtain three holograms using light sources of different wavelengths, e.g. a red light, a green light and a blue light, so as to be used in an computation algorithm for eliminating the aforesaid phase wrapping. It is noted that the process of eliminating phase wrapping not only is complex and thus difficult to implement, but also can be very time-consuming that seriously affect the measurement speed.

There are already many studies and patents relating to the improvement over the aforesaid shortcomings. One of which is an essay by Myung K. Kim and S. De Nicola et al. at 2003. In this essay, a light source capable of emitting at least two beams of different wavelengths is used as the light source for an off-axis digital holography or a digital holographic microscopy so that at least two holograms can be obtained and used in an numerical computation for reducing phase wrapping and thus the range of surface depth variation of a target object can be detected and measured without being affected by phase noises.

Another such study is an essay by Lingfeng Yu and M. K. Kim et al. at 2004, in which a three-colored LED is used as the light source for an on-axis digital holographic microscopy so that the on-axis digital holographic microscopy is able to reconstruct the profile of a target object by a phase shifting method and thus can be applied for obtaining microscopic three-dimensional images of biological cells.

Yet, there is another essay provided by Myung K. Kim and N. Warnasooriya et al. at 2007. In this essay, a multi-band LED is used as the light source for a holographic measurement by which an axial depth of 7.84 microns can be reached after two computations of synthetic wavelength without causing phase wrapping.

Moreover, another such study is disclosed in U.S. Pat. No. 6,809,845, entitled "Phase imaging using multi-wavelength digital holography". In an exemplary embodiment of the aforesaid patent, a two-wavelength laser holography is revealed, by which a axial range of measurement is increased while the effect of phase noise generated from numerical computations is reduced.

From the above description, it is noted that the application of any conventional multi-color digital holographic system in measurement is originated from the need for solving phase wrapping problem, and since most conventional multi-color digital holographic system adopts monochromatic CCD for catching images, only one hologram of one specific wavelength can be obtained by a single shot so that, as it will require to take multiple shots for obtaining holograms of different wavelengths, the processing of the multi-color digital holographic system not only is complex and difficult to implement, but also is very time-consuming that seriously affect the measurement speed.

SUMMARY OF THE INVENTION

The object of the present invention is to provide a multi-color off-axis digital holographic system and the imaging method thereof, capable of quickly catching holograms with three different wavelengths by one-shot measurement without being affected by phase wrapping.

To achieve the above object, the present invention provide a multi-color off-axis digital holographic system, comprising: a plurality of light emitting diodes, for provide a red (R) beam, a green (G) beam and a blue (B) beam; an interference object lens module, for receiving the R, G, and B beams to generate a beam containing an interference signal; a color imaging device, for receiving the beam containing the interference signal and thus forming a hologram on a surface of the color imaging device by holographic interference while registering the hologram; and a processing device, for receiving the registered hologram form the color imaging device; wherein the processing device perform a zero-filling and reconstructing operations upon the received hologram to obtain phase information of the R, G and B beams; wherein, a three-dimensional surface profile with respect to a RG synthetic wavelength is obtained according to a calculation using the phase information of the R and G beams as well as the wavelengths thereof, and similarly, a three-dimensional surface profile with respect to a GB synthetic wavelength is obtained according to a calculation using the phase information of the G and B beams as well as the wavelengths thereof, and an overall three-dimensional surface profile with respect to a complete synthetic wavelength is obtained by performing a calculation using the RG synthetic wavelength and its phase as well as the GB synthetic wavelength and its phase.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
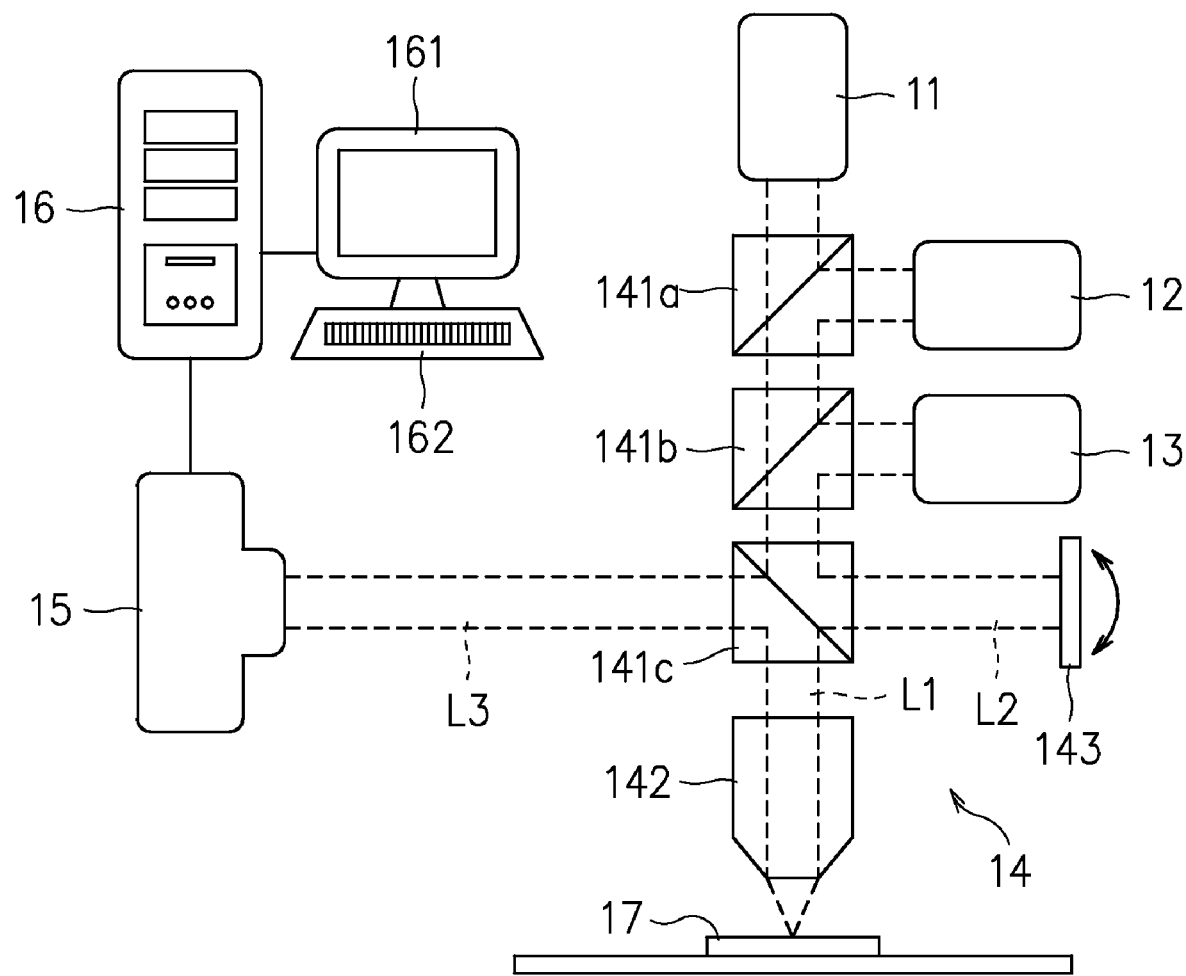
FIG. 1 is a sectional view of a multi-color off-axis digital holographic system according to an exemplary embodiment of the invention.

Please refer to FIG. 1, which is a sectional view of a multi-color off-axis digital holographic system according to an exemplary embodiment of the invention. In the exemplary embodiment of FIG. 1, a multi-color off-axis digital holographic system 10 is provided, which comprises: three light emitting diodes (LEDs) 11, 12,13; an interference object lens module 14; a color imaging device 15; and a processing device 16. The three light emitting diodes (LEDs), being a red LED 11, a green LED 12, and a blue LED 13, are capable of emitting a red (R) beam, a green (G) beam and a blue (B) beam in respective. The interference object lens module 14 is further comprised of three beam splitters 141a, 141b, 141, an object lens 142 and a reflection mirror 143, in which the three beam splitters 141a, 141b, 141c are used for receiving the R, G, and B beams while splitting the same into an object beam L1 and a reference beam L2; the object lens 142 is used for receiving the object beam L1 while directing the same to project upon a sample 17 where it is scattered into a scattered object beam and projected back to the object lens 142; and the reflection mirror 143 is used for receiving and thus reflecting the reference beam L2 in a manner that the reflected reference beam is combined with the scattered object beam into a beam L3 containing interference signals. The color imaging device 15, being a device selected from the group consisting of a charge coupled device (CCD) and a complementary metal oxide semiconductor (CMOS) device, is used for receiving the beam L3 containing the interference signal and thus forming a hologram on a surface of the color imaging device by holographic interference while registering the hologram. It is noted that as the color imaging device 15 is going to form a red (R), a green (G) and a blue (B) holograms corresponding to the red, the green and the blue LEDs 11, 12, 13 in respective so that a reconstruction operation is required to be perform by the processing device 16 using the R, G, and B holograms. In addition, the processing device 16 is a computer system configured with a monitor 161 for displaying process status and a keyboard 162 for imputing control commands.

Figure 2:
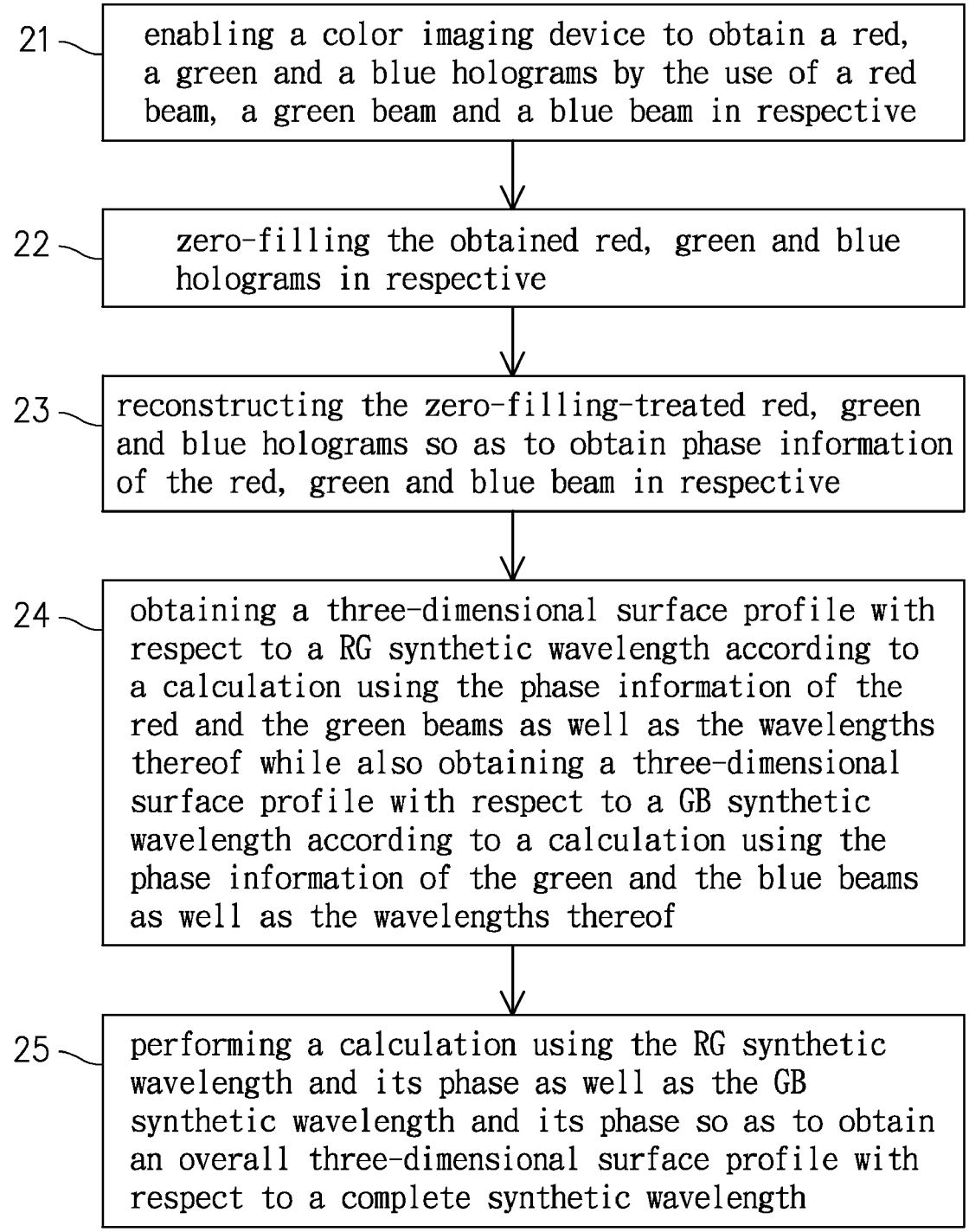
FIG. 2 is a flow chart depicting steps of an imaging method using the a multi-color off-axis digital holographic system of the invention.

As shown in FIG. 2, with the aforesaid multi-color off-axis digital holographic system 10, an imaging method 20 can be concluded which comprises the steps of:

Step 21: enabling the color imaging device 15 of the multi-color off-axis digital holographic system 10 to obtain a red, a green and a blue holograms by the use of a red beam, a green beam and a blue beam in respective;

Step 22: zero-filling the obtained red, green and blue holograms in respective;

Step 23: reconstructing the zero-filling-treated red, green and blue holograms so as to obtain phase information of the red, green and blue beam in respective;

Step 24: obtaining a three-dimensional surface profile with respect to a RG synthetic wavelength according to a calculation using the phase information of the red and the green beams as well as the wavelengths thereof while also obtaining a three-dimensional surface profile with respect to a GB synthetic wavelength according to a calculation using the phase information of the green and the blue beams as well as the wavelengths thereof; and Step 25: performing a calculation using the RG synthetic wavelength and its phase as well as the GB synthetic wavelength and its phase so as to obtain an overall three-dimensional surface profile with respect to a complete synthetic wavelength.

The detail relating to the zero-filling process perform in the step 22, the reconstructing process performed in the step 23 and the forming of the three-dimensional surface profile performed in the step 24 and the step 25 are described in the following.

In the zero-filling process performed in the step 22, since the resolution of a reconstructed image will be varied with respect to wavelength and reconstruction distance, it is required to fixed the resolutions of reconstructed images of different wavelengths to a same value by the following algorithm:

$$\text{setting a reconstruction distance} \quad (1)$$

$$\text{while defining} \begin{aligned} N_2 &= \text{int}(N_1 * \lambda_2 / \lambda_1) \\ M_2 &= \text{int}(M_1 * \lambda_2 / \lambda_1); \end{aligned}$$

for holograms obtained from beams of different wavelengths, i.e. $\lambda_1$ and $\lambda_2$ wherein int is a function for returning the integer part of a specified number;

$N_1*M_1$ is the overall pixels contained in the hologram of $\lambda_1$.

After the hologram of $\lambda_2$ is enlarged into an $N_2*M_2$ array using the zero-filling process, the enlarged hologram will be treated by the aforesaid reconstruction process for enabling the resolution of the reconstructed hologram of $\lambda_2$ to equal to that of the reconstructed hologram of $\lambda_1$.

For a two-wavelength experiment, the hologram are made by the use of a light source capable of emitting a 625 nm red beam and a 525 nm green beam and a color imaging device with 1024*1024 pixels, from which in order to obtain the same resolution after reconstruction, the hologram made of the 625 nm red beam must by zero-filled for increasing the pixel number of the red-beam hologram from 1024*1024 to 1216*1219 before it can be used in the following formula (2) for reconstruction.

The reconstructing process of the step 23 is performed according to the following formula:

$$\Psi(m,n) = A\varphi(m,n)\exp\left[\frac{i\pi}{\lambda d}(m^2\Delta\xi^2 + n^2\Delta\eta^2)\right] \times \qquad (2)$$
$$FFT\left\{R(k,l)I_H(k,l) \times \exp\left[\frac{i\pi}{\lambda d}(k^2\Delta x^2 + l^2\Delta y^2)\right]\right\}_{m,n};$$

wherein $\lambda$ represents wavelength;
d represents the reconstruction distance;
m, n, k, l are CCD pixel number;
$\Delta\xi = \Delta\eta = \lambda d/L$ represent the resolution after reconstruction while L is the size of the color imaging device;
$\Delta x, \Delta y$ are pixel size of the color imaging device;
$A = \exp(i2\pi d/\lambda)$ is a complex number constant;
FFT{ } is a Fourier operator;

$$\varphi(m,n) = \exp\left[\frac{-i\pi}{\lambda D}(m^2\Delta\xi^2 + n^2\Delta\eta^2)\right]$$

is a phase mask used for compensating object lens aberration;
$R(k,l) = A_R \exp[i(2\pi/\lambda)(k_x k\Delta x + k_y l\Delta y)]$ is the reference beam;
$I_H(k,l)$ is the hologram.

The step 24 and the step 25 are used for solving the problem of phase wrapping. Assuming that $\phi_R$ is the phase reconstruction function for a red beam of $\lambda_R$ wavelength; $\phi_G$ is the phase reconstruction function for a green beam of $\lambda_G$ wavelength; $\phi_B$ is the phase reconstruction function for a blue beam of $\lambda_B$ wavelength, the surface profile function $Z'_{RG}$ with reference to $\lambda_R$ and $\lambda_G$ as well as the surface profile function $Z'_{GB}$ with reference to $\lambda_G$ and $\lambda_B$ can be represent as following:

$$Z'_{RG} = \Lambda_{RG} * \varphi_{RG}/2\pi;$$

$$\Lambda_{RG} = (\lambda_R * \lambda_G)/|\lambda_R - \lambda_G|;$$

$$\varphi_{RG} = \varphi_R - \varphi_G;$$

wherein $$\varphi'_{RG} = \varphi_{RG} + 2\pi$$

when $$\varphi_{RG} < 0;$$

$$\varphi'_{RG} = \varphi_{RG} - 2\pi$$

when $$\varphi_{RG} > \pi.$$

and $$Z'_{GB} = \Lambda_{GB} * \varphi_{GB}/2\pi;$$

$$\Lambda_{RG} = (\lambda_G * \lambda_B)/|\lambda_G - \lambda_B|;$$

$$\varphi_{GB} = \varphi_G - \varphi_B;$$

wherein $$\varphi'_{GB} = \varphi_{GB} + 2\pi$$

when $$\varphi_{GB} < 0;$$

$$\varphi'_{GB} = \varphi_{GB} - 2\pi$$

when $$\varphi_{GB} > \pi.$$

Moreover, $\Lambda_{RG}$ and $\Lambda_{GB}$ respectively are a RG synthetic wavelength obtained according to a calculation using the phase information of the R and G beams as well as the wavelengths thereof and a GB synthetic wavelength obtained according to a calculation using the phase information of the G and B beams as well as the wavelengths thereof.

Thereafter, an overall three-dimensional surface profile $Z'_{RG,GB}$ with respect to the aforesaid $\Lambda_{RG}$, $\phi_{RG}$, $\Lambda_{GB}$, and $\phi_{GB}$ can be obtained according to the following formula:

$$Z'_{RG,GB} = \Lambda_{RG,GB} * \phi_{RG,GB}/2\pi;$$

$$\Lambda_{RG,GB} = (\Lambda_{RG} * \Lambda_{GB})/|\Lambda_{RG} - \Lambda_{GB}|;$$

$$\phi_{RG,GB} = \phi_{RG} - \phi_{GB};$$

For instance, when $\lambda_R = 627$ nm, $\lambda_G = 530$ nm, $\lambda_B = 470$ nm, the RG synthetic wavelength $\Lambda_{RG}$ is 3.426 μm and the GB synthetic wavelength $\Lambda_{GB}$ is 4.152 μm so that the resulting $\Lambda_{RG,GB}$ will reach 19.593 μm and thus no phase wrapping will be generated.

Figure 3:
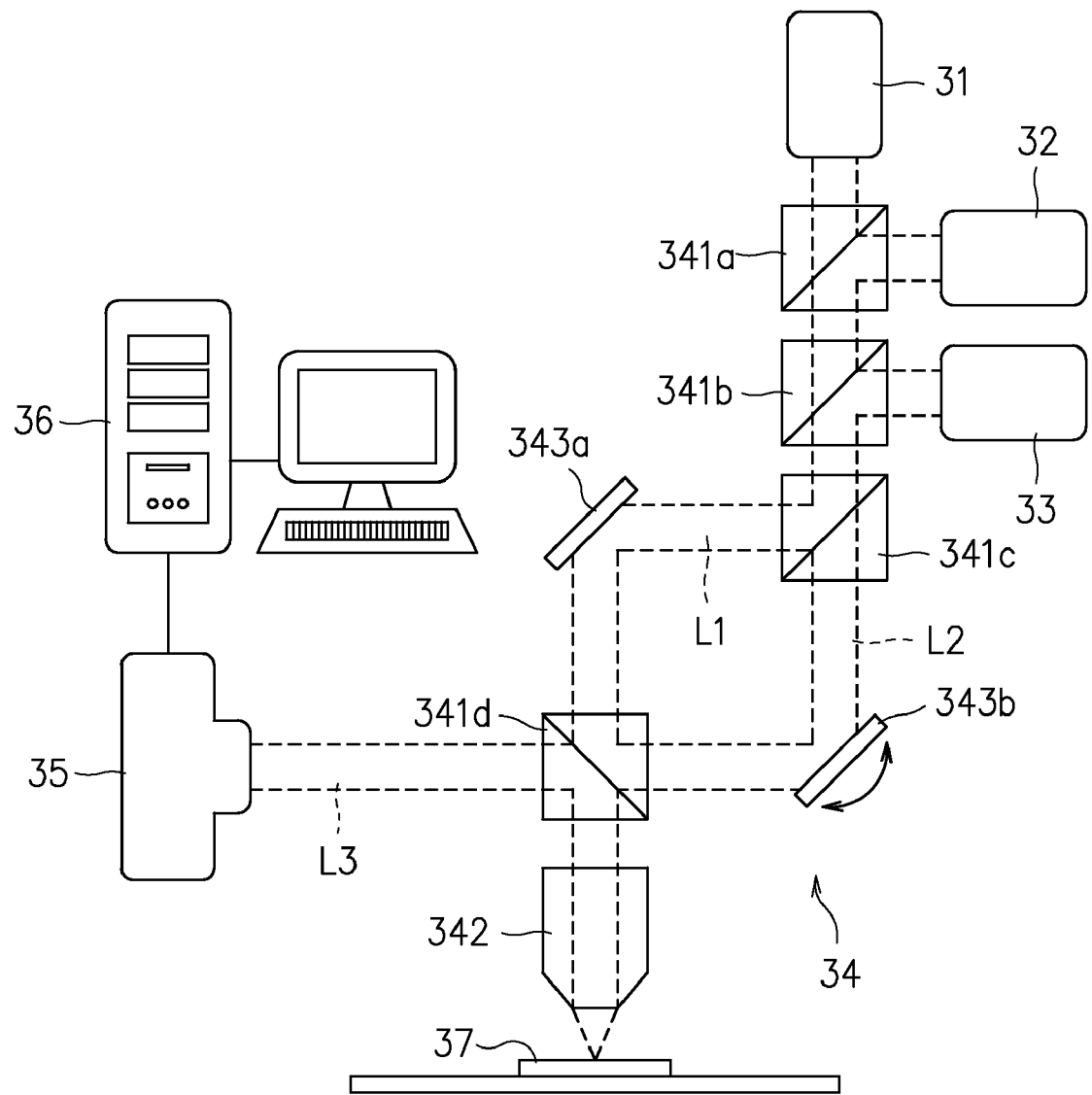
FIG. 3 is a sectional view of a multi-color off-axis digital holographic system according to another exemplary embodiment of the invention.

Please refer to FIG. 3, which is a sectional view of a multi-color off-axis digital holographic system according to another exemplary embodiment of the invention. In this exemplary embodiment, the multi-color off-axis digital holographic system 10 comprises: a red LED 31, a green LED 32, a blue LED 33, an interference object lens module 34, a color imaging device 35 and a processing device 36. The difference between this embodiment and the one shown in FIG. 1 is that: the interference object lens module 34 is composed of four beam splitters 341a~341d, an object lens 342 and two reflection mirrors 343a, 343b, in which the beam splitters 341a~341d are used for receiving the R, G, and B beams while splitting the same into an object beam L1 and a reference beam L2; the reflection mirrors 343a, 343b are used respectively for receiving the object beam L1 and a reference beam L2; the object lens 342 is used for receiving the object beam L1 while directing the same to project upon a sample 37 where it is scattered into a scattered object beam and projected back to the object lens 342; and the reflection mirror 343a is used for receiving and thus reflecting the reference beam L2 in a manner that the reflected reference beam is combined with the scattered object beam into a beam L3 containing interference signals, and the reflecting the combined beam toward the color imaging device 35. The color imaging device 35 is used for receiving the beam L3 containing the interference signal and thus forming R, G, B holograms by holographic interference and then transmits the hologram to the processing device 36 where they are reconstructed. It is noted that since the reconstruction operation performed in this embodiment is the same as that used in FIG. 1, it is not described further herein.

To sum up, the present invention provides a multi-color off-axis digital holographic system configured with a color imaging device and a light emitting diode capable of emitting a red, a green and a blue beams for enabling the system to be capable of quickly catching holograms with the three different wavelengths by one-shot, by which not only can achieve instant measurement with high reconstruction speed, but also can prevent the speckle noise as well as the reconstruction error caused by laser beams. In addition, as the holographic system of the invention uses a light source of multiple wavelengths, it can generate a three-dimensional surface profile of a target object by the use of reconstructed holograms of different wavelengths and the resulting synthetic wavelength obtained according to a calculation using the phase information of different wavelengths so that the abovementioned problems relating to height limitation and phase wrapping can be effected improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-color off-axis digital holographic system, comprising:
   a plurality of light emitting diodes, for provide a red (R) beam, a green (G) beam and a blue (B) beam;
   an interference object lens module, for receiving the R, G, and B beams and generating a beam containing an interference signal by combining a reflected reference beam with a scattered object beam resulting from light being scattered by a sample;
   a color imaging device, for receiving the beam containing the interference signal and forming a respective hologram on a surface of the color imaging device by holographic interference while registering the hologram; and
   a processing device, for zero-filling the obtained red, green, and blue holograms respectively, to adjust the resolutions of each hologram having different wavelenths to a uniform hologram image array size by defining the uniform hologram image array size for holograms obtained from beams of different wavelen the and settin a reconstruction distance, and receiving the registered hologram from the color imaging device to perform a reconstruction operation using the reconstruction distance, the size and pixel size of the color imaging device, and a phase mask for compensating for lens aberration, obtaining phase information of the red, green, and blue beam, respectively.

2. The multi-color off-axis digital holographic system of claim 1, wherein the interference object lens module further comprises:
   three beam splitters, for receiving the R, G, and B beams while splitting the same into an object beam and a reference beam;
   an object lens, for receiving the object beam while directing the same to project upon a sample where it is scattered into a scattered object beam and projected back to the object lens; and
   a reflection mirror, for receiving and thus reflecting the reference beam in a manner that the reflected reference beam is combined with the scattered object beam into the beam containing the interference signal.

3. The multi-color off-axis digital holographic system of claim 2, wherein the color imaging device is a device selected from the group consisting of a charge coupled device (CCD) and a complementary metal oxide semiconductor (CMOS) device.

4. The multi-color off-axis digital holographic system of claim 1, wherein the interference object lens module further comprises:
   four beam splitters, for using three of them selected from the four beam splitters to receive and splitter the R, G, and B beams the same into an object beam and a reference beam;
   two reflection mirrors, for receiving the object beam and the reference beam in respective; and
   an object lens, for receiving the object beam while directing the same to project upon a sample where it is scattered into a scattered object beam and projected back to the object lens.

5. The multi-color off-axis digital holographic system of claim 4, wherein the color imaging device is a device selected from the group consisting of a charge coupled device (CCD) and a complementary metal oxide semiconductor (CMOS) device.

6. The multi-color off-axis digital holographic system of claim 1, wherein the color imaging device is a device selected from the group consisting of a charge coupled device (CCD) and a complementary metal oxide semiconductor (CMOS) device.

7. A multi-color off-axis digital holographic imaging method, comprising the steps of:
   (A) enabling a color imaging device to obtain a red, a green, and a blue holograms by the use of a red beam, a green beam, and a blue beam, respectively, by receiving a reflected reference beam combined with a scattered object beam resulting from light being scattered by a sample, and directing this combined beam containing holographic interference signals to the surface of the color imaging device to form a hologram;
   (B) zero-filling the obtained red, green, and blue holograms respectively, to adjust the resolutions of each hologram having different wavelengths to a uniform hologram image array size by defining the uniform hologram image array size for holograms obtained from beams of different wavelengths and setting a reconstruction distance;
   (C) reconstructing the zero-filling-treated red, green, and blue holograms using the reconstruction distance, the size and pixel size of the color imaging device, and a phase mask for compensating for lens aberration, so as to obtain phase information of the red, green, and blue beam, respectively;
   (D) obtaining a three-dimensional surface profile with respect to a RG synthetic wavelength according to a calculation using the phase information of the red and the green beams as well as the wavelengths thereof while also obtaining a three-dimensional surface profile with respect to a GB synthetic wavelength according to a calculation using the phase information of the green and the blue beams as well as the wavelengths thereof; and
   (E) performing a calculation using the RG synthetic wavelength and its phase as well as the GB synthetic wavelength and its phase so as to obtain an overall three-dimensional surface profile with respect to a complete synthetic wavelength.

8. A multi-color off-axis digital holographic system, comprising:

a plurality of light emitting diodes, for providing a red (R) beam, a green (G) beam and a blue (B) beam;

an interference object lens module, for receiving the R, G, and B beams and generating a beam containing an interference signal comprising:

three beam splitters, for receiving the R, G, and B beams while splitting the same into an object beam and a reference beam;

an object lens, for receiving the object beam while directing the same to project upon a sample where it is scattered into a scattered object beam and projected back to the object lens; and a reflection mirror, for receiving and thus reflecting the reference beam in a manner that the reflected reference beam is combined with the scattered object beam into the beam containing the interference signal;

a color imaging device, for receiving the beam containing the interference signal and forming a hologram on a surface of the color imaging device by holographic interference while registering the hologram; and a processing device, for zero-filling the obtained red, green, and blue holograms respectively, to adjust the resolutions of each hologram having different wavelengths to a uniform hologram image array size by defining the uniform hologram image array size for holograms obtained from beams of different wavelengths and setting a reconstruction distance and receiving the registered hologram from the color imaging device to perform a reconstruction operation using the reconstruction distance, the size and pixel size of the color imaging device, and a phase mask for compensating for lens aberration, obtaining phase information of the red, green, and blue beam, respectively.

9. A multi-color off-axis digital holographic system, comprising:

a plurality of light emitting diodes, for providing a red (R) beam, a green (G) beam and a blue (B) beam;

an interference object lens module, for receiving the R, G, and B beams and generating a beam containing an interference signal comprising:

four beam splitters for receiving and splitting the R, G, and B beams into an object beam and a reference beam by utilizing three of said four beam splitters;

an object lens, for receiving the object beam while directing the same to project upon a sample where it is scattered into a scattered object beam and projected back to the object lens; and two reflection mirrors, for receiving the object beam and the reference beam in respective and generating a beam containing an interference signal;

a color imaging device, for receiving the beam containing the interference signal and forming a hologram on a surface of the color imaging device by holographic interference while registering the hologram; and a processing device, for zero-filling the obtained red, green, and blue holograms respectively, to adjust the resolutions of each hologram having different wavelengths to a uniform hologram image array size by defining the uniform hologram image array size for holograms obtained from beams of different wavelengths and settin a reconstruction distance, and receiving the registered hologram from the color imaging device to perform a reconstruction operation using the reconstruction distance, the size and pixel size of the color imaging device, and a phase mask for compensating for lens aberration, obtaining phase information of the red, green, and blue beam, respectively.

\* \* \* \* \*